United States Patent [19]
Pike

[11] 3,775,903
[45] Dec. 4, 1973

[54] CONTAINERS

[76] Inventor: John Francis Pike, 57 Park Rd., Rydalmere, New South Wales, Australia

[22] Filed: Aug. 20, 1971

[21] Appl. No.: 173,591

[30] Foreign Application Priority Data
Sept. 9, 1970 Australia.................................. 2478

[52] U.S. Cl............................... 47/37, 150/DIG. 1
[51] Int. Cl............................................. A01g 9/02
[58] Field of Search...................... 150/DIG. 1, 1.7, 150/1; 47/37, 34, 34.11

[56] References Cited
UNITED STATES PATENTS

| | | | |
|---|---|---|---|
| 3,094,810 | 6/1963 | Kalpin...................................... | 47/37 |
| 344,340 | 6/1886 | Barrow .......................... | 150/DIG. 1 |
| 2,431,452 | 11/1947 | Barkl ............................. | 150/DIG. 1 |
| 1,994,962 | 3/1935 | Rushfeldt........................... | 47/34.11 |
| 2,504,124 | 4/1950 | Hicks....................................... | 150/1 |
| 3,375,607 | 4/1968 | Melvold................................. | 47/37 |

FOREIGN PATENTS OR APPLICATIONS
1,519,499  2/1968  France

Primary Examiner—Robert E. Bagwill
Attorney—Michael S. Striker

[57] ABSTRACT

A container intended principally for use as a plant pot, made of flexible plastics material, of generally cylindrical shape and having a semi-rigid or flexible bottom and stiffening means around at least the upper periphery of the container; such features as drainage holes, reinforcing straps and carrying handles may optionally be provided.

4 Claims, 6 Drawing Figures

PATENTED DEC 4 1973 3,775,903
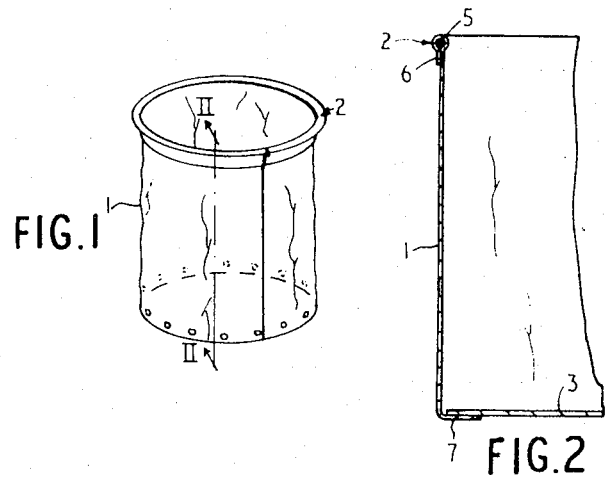
FIG.1
FIG.2
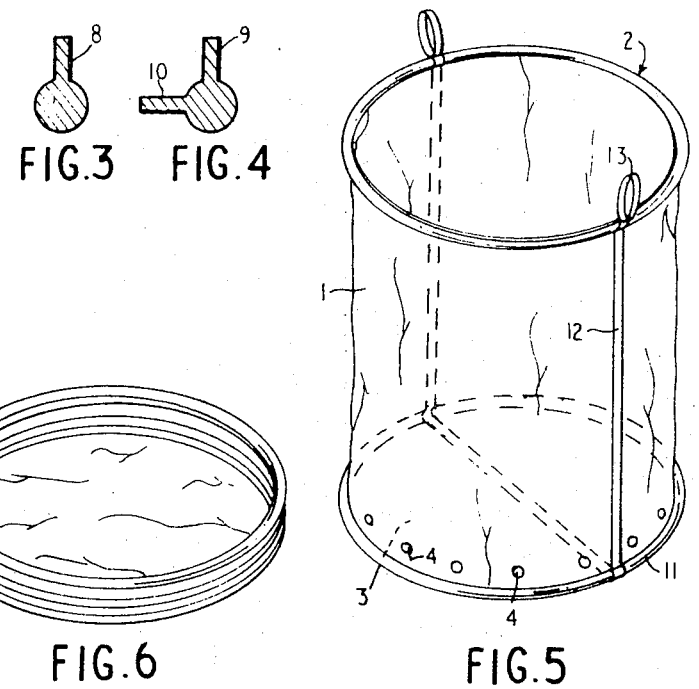
FIG.3 FIG.4
FIG.6 FIG.5
Inventor
JOHN FRANCIS PIKE
By
Attorney

CONTAINERS

The present invention relates to containers and is applicable particularly, although not exclusively to containers in which to grow plants.

While a container according to the invention may well be found to be applicable in other fields, the invention will be described for convenience in terms of its application to a plant container.

Traditionally plants were grown in earthenware pots of frust-conical shape. Subsequently, plastic posts and metal containers were developed of a similar shape. More recently plants have been grown in bags constructed in a manner somewhat similar to an ordinary paper bag but made of polythene. These bags are popular in plant nurseries on account of their low cost, durability and the fact that they occupy very little storage space before use. From the purchaser's point of view they are very desirable because they can be very easily removed from around the soil in which the plant is growing without breaking the root ball. Such containers do, however, have the disadvantage that when they are being filled the mouth of the hag has to be held open and while quite suitable for use in the nursery, do not have a very attractive appearance at the point of sale.

The main object of the invention is to provide a plant container which has the advantages of the polythene bag, while overcoming the disadvantages mentioned above.

The present invention provides a container comprising a right cylindrical wall portion of flexible plastics material, one end of said wall portion being closed by either a semirigid or a flexible bottom portion the periphery shape of which corresponds to the cross-sectional shape of the wall portion, said wall portion being provided around at least its upper pheriphery with peripheral stiffening means which act to preserve the cross-sectional shape of said container, the arrangement being such that the container is capable of being brought into a flattened configuration by pressing the upper periphery of the wall portion towards the bottom portion while suitably deforming the wall portion and is thereafter restorable to its normal configuration ready for filling. While the peripheral stiffening means act to preserve the cross-sectional shape of the container, they may be of material which is not so rigid as to exclude cross-sectional deformation of the container so that several such containers may be nested one within another; suitable peripheral means being discussed hereinafter.

Where the container is intended as a plant container, drainage holes are advantageously provided in the bottom portion or, more advantageously, in the wall portion adjacent its junction with the bottom portion.

The wall portion of the container is preferably circular in cross section and is made from a flexible plastic material such as polthene or polyvinylchloride or any other suitable flexible plastics material. The wall portion may be formed by joining the ends of such a plastics material in sheet form by welding or bonding or it may be formed from extended flexible plastics tubing. The wall may advantageously be of a thickness between 4 and 10 thousandths of an inch and is preferably treated against action by ultraviolet radiation.

The thinner the material of the wall portion, the more easily is the container compressed into compact flattened configuration but on the other hand the thicker the material the more durable is the container and the more readily it may be restored to a normal configuration ready for filling.

As will be understood, the choice of wall thickness will also depend on the size of the container.

The container in its normal configuration is a right cylinder and this configuration is maintained by peripheral stiffening means provided around at least the upper periphery of the wall portion. Lower peripheral stiffening means may also be provided around the lower periphery of the wall portion where this is expedient. Such stiffening means may take various forms and these are discussed hereinafter.

The lower end of the container is closed by a bottom portion which is either simi-rigid or flexible. A flexible bottom portion is mot advantageously made form material similar to that used for the wall portion. The bottom portion is preferably secured to the wall portion by welding, although bonding is also contemplated, and a lower peripheral stiffening means, when used and where the bottom portion is semi-rigid, amy be constituted by the periphery of the bottom portion.

A container such as that described above may readily be flattened by pressing the upper stiffening means of the wall portion towards the bottom portion and a very compact light package is formed. However, when the container is to be used it can be readily restored to its normal configuration in which it will stand upright on the ground with the top open leaving the container ready for rapid filling with soil. The peripheral stiffening means may be formed of any suitable material, but preferably of a material which can be readily cut with domestic scissors to faciliatate the removal of the container from around the root ball of a plant. The stiffening means may be made of extruded plastics material or they may be injection-molded rings of plastics material, both types being of basically circular cross-section but having a longitudinally extending radially projecting flange to which the material of the wall portion may be welded or bonded. Lower peripheral stiffening means may have two such flanges, one of which is welded or bonded to the wall portion and the other of which is welded or bonded to the bottom portion. The stiffening means may be formed by rolling an edge of the wall portion until a thickened ring is formed which is sufficient to maintain the cross-sectional shape of container. In order to minimise material and costs, the stiffening means may be of hollow plastics "spaghetti" welded or bonded to the wall portion.

In an alternative contruction the wall portion may be made of polythene sheet which is extruded with one or both of the periphery stiffening means formed integrally with the sheet.

In the case of large containers, they may be formed with at least one reinforcing strap extending down one side of the wall portion, across the bottom portion and up the other side, handles being provided at the upper ends of the straps or strap.

In order that the invention may be better understood, some preferred embodiments will now be described, as examples only, with reference to the drawing in which:

FIG. 1. shows a container according one form of the invention having upper peripheral stiffening means.

FIG. 2. Shows one form of peripheral stiffening means in cross section.

FIG. 3. shows another form of peripheral stiffening means in cross section.

FIG. 4. shows another form of peripheral stiffening means in cross section.

FIG. 5. illustrates a container according to one form of the invention having upper and lower peripheral stiffening means and a handled reinforcing strap, and FIG. 6. is illustrative of a container according to the invention in flattened configuration.

In FIGS. 1 and 2. is shown a container according to the invention having a wall portion 1. made of flexible plastics sheet material. Upper peripheral stiffening means 2 is constituted by the upper peripheral edge of the wall portion 1 being rolled around a resilient plastics rod 5 and welded or bonded to itself at 6, as shown in FIG. 2. A bottom portion 3 is welded or bonded to the wall portion 1 as shown at 7 in FIG. 2. Drainage holes 4 are provided in wall portion 1 adjacent its junction with bottom portion 3.

FIG. 3 illustrates in cross-section one form of upper peripheral stiffening means in which an extruded or injection molded member has a radially projecting flange 8 to which the wall portion 1 may be welded or bonded, while FIG. 4 illustrates in cross section a lower peripheral stiffening means in which a similar extruded or injection molded member has two radially extending flanges 9 and 10 substantially at right angles to one another, one of which is welded or bonded to wall portion 1 and the other of which is welded or bonded to bottom portion 3 in the case of a container provided with both upper and lower peripheral stiffening means as shown in FIG. 5.

FIG. 5 shows a larger container acording to the invention, again having a wall portion 1, upper peripheral stiffening means 2, a bottom protion 3 and drainage holes 4. A lower peripheral stiffening means 11 is provided around the lower periphery of wall portion 1. A reinforcing strap 12 extends down on one side of the wall portion 1, across the bottom portion 3 and up the other side of wall portion 1. Reinforcing strap 12 may be secured in postion by welding or bonding and is provided with handles 13 formed by loops at the upper ends of reinforcing strap 12.

FIG. 6 shows a container according to the invention, such as the container shown in FIG. 1, when pressed into the flattened configuration to make a compact package for storage and packing purposes.

The above examples do not exhaust the various possible forms of construction within the scope of the invention and are given simply to assist in a full understanding of the nature of the invention.

One application of the invention to containers other than plant containers is as a container for ice-cream in place of the usual rigid styrene and metal containers; another is a container for cut flowers, bouquets and the like, for which use the flexible plastics material used for the wall portion may be transparent.

What I claim is:

1. A container comprising a right cylindrical wall portion of flexible polythene sheet 4 to 10 thousandths of an inch thick and treated against the action of ultraviolet radiation, one end of said wall portion being closed by a flexible bottom portion the peripheral shape of which corresponds to the cross-sectional shape of the wall portion, and drainage holes spaced around the periphery of the wall portion adjacent its junction with the bottom portion; said wall portion being provided around its upper periphery with stiffening means of substantially circular cross-section but with a longitudinally extending radially projecting flange to which the wall portion is affixed, and around its lower periphery with stiffening means of substantially circular cross-section but with two longitudinally extending radially projecting flanges to one of which is affixed the wall portion and to the other of which is affixed the bottom portion; said container being provided with at least one reinforcing strap extending down one side of the wall portion, handles being provided at the upper ends of the reinforcing strap or straps.

2. A container for plants comprising a right cylindrical wall portion of thin flexible plastics material; a bottom portion of plastics material having a peripheral shape corresponding to the cross-sectional shape of said wall portion connected to and closing one end of said wall portion; peripheral stiffening means of plastics material provided at least on the other end of said wall portion; a plurality of circumferentially spaced drainage holes provided only in said wall portion adjacent said one end thereof; and at least one reinforcing strap extending down one side of said wall portion, across the bottom portion and up the other side of the wall portion, and projecting with an handle portion at each of the ends thereof beyond the other end of said cylindrical wall portion.

3. The container of claim 2 in which lower peripheral stiffening means is also provided around the lower periphery of the wall portion.

4. The container of claim 2 in which the or each stiffening means is of substantially circular cross-section but is provided with a longitudinally extending radially projecting flange to which is affixed the wall portion.

* * * * *